US008719064B1

(12) United States Patent
Heron et al.

(10) Patent No.: US 8,719,064 B1
(45) Date of Patent: May 6, 2014

(54) ADMINISTRATION AND CUSTOMIZATION PLATFORM FOR IN-VEHICLE SERVICES

(71) Applicant: Kwivo, LLC, Brooklyn, NY (US)

(72) Inventors: Alexandra Kathleen Heron, New York, NY (US); Julio Toro Silva, Panamá (PA); Manimeldura Janaka Mendis, Sar (BH)

(73) Assignee: Kwivo, LLC, Brooklyn, NY (US)

( * ) Notice: Subject to any disclaimer, the term of this patent is extended or adjusted under 35 U.S.C. 154(b) by 0 days.

(21) Appl. No.: 13/844,169

(22) Filed: Mar. 15, 2013

(51) Int. Cl.
*G06Q 10/00* (2012.01)
*G06Q 50/00* (2012.01)

(52) U.S. Cl.
USPC .................................. 705/6; 705/5

(58) Field of Classification Search
USPC ........................ 705/5–6; 235/375
See application file for complete search history.

(56) References Cited

U.S. PATENT DOCUMENTS

| | | | |
|---|---|---|---|
| 4,352,200 A | 9/1982 | Oxman | 455/41 |
| 5,006,985 A * | 4/1991 | Ehret et al. | 705/1.1 |
| 5,880,867 A | 3/1999 | Ronald | 359/152 |
| 5,959,596 A | 9/1999 | McCarten et al. | 345/2 |
| 6,094,640 A | 7/2000 | Goheen | 705/5 |
| 6,509,829 B1 * | 1/2003 | Tuttle | 340/10.1 |
| 6,559,812 B1 | 5/2003 | McCarten et al. | 345/2.1 |
| 6,810,527 B1 * | 10/2004 | Conrad et al. | 725/76 |
| 6,957,772 B1 | 10/2005 | Green et al. | 235/384 |
| 6,973,479 B2 | 12/2005 | Brady, Jr. et al. | 709/203 |
| 7,177,638 B2 | 2/2007 | Funderburk et al. | 455/431 |
| 7,280,825 B2 | 10/2007 | Keen et al. | 455/431 |
| 7,675,849 B2 | 3/2010 | Watson et al. | 370/217 |
| 7,725,569 B2 | 5/2010 | Brady, Jr. et al. | 709/223 |
| 7,945,934 B2 | 5/2011 | Margis et al. | 725/75 |
| 7,984,190 B2 | 7/2011 | Rhoads | 709/248 |
| 8,037,500 B2 | 10/2011 | Margis et al. | 725/75 |
| 8,103,211 B1 | 1/2012 | Fujisaki | 455/3.06 |
| 8,180,678 B2 | 5/2012 | Brotherston | 705/22 |
| 8,283,801 B2 | 10/2012 | Petitpierre | 307/9.1 |
| 8,315,762 B2 | 11/2012 | Correa et al. | 701/36 |
| 8,322,723 B1 | 12/2012 | Bancel et al. | 273/274 |

(Continued)

OTHER PUBLICATIONS

Liu, et al., Toward Next-Generation In-Flight Entrertainment Systems: A Survey of the State of the Art and Possible Extensions, Advances in Semantic Media Adaptation and Personalization, 2008, pp. 95-111.*

(Continued)

*Primary Examiner* — Daniel Vetter
(74) *Attorney, Agent, or Firm* — Pillsbury Winthrop Shaw Pittman LLP

(57) ABSTRACT

An approach to facilitating in-vehicle-services-related tracking of passengers is provided. A first set of information relating to a first carrier and a second set of information relating to a second carrier that is different from the first carrier may be obtained. The first set of information may include first identification information and one or more first trip details. The second set of information may include second identification information and one or more second trip details. The first set of information may be determined to relate to a first trip of a particular passenger with the first carrier. The second set of information may be determined to relate to a second trip of the particular passenger with the second carrier. Preference information of the particular passenger may be determined based on the one or more trip details and the one or more second trip details.

29 Claims, 7 Drawing Sheets

(56) References Cited

U.S. PATENT DOCUMENTS

| | | |
|---|---|---|
| 8,328,094 B2 | 12/2012 | Proud et al. .................. 235/383 |
| 2002/0010633 A1 | 1/2002 | Brotherston .................... 705/26 |
| 2002/0059614 A1 | 5/2002 | Lipsanen et al. ................ 725/75 |
| 2002/0100803 A1* | 8/2002 | Sehr ............................. 235/384 |
| 2002/0107916 A1 | 8/2002 | Nii et al. ...................... 709/203 |
| 2002/0109647 A1 | 8/2002 | Crandall et al. ............... 345/2.1 |
| 2002/0170060 A1 | 11/2002 | Lyman ........................... 725/73 |
| 2003/0046438 A1* | 3/2003 | O'Donnell .................... 709/250 |
| 2003/0046701 A1 | 3/2003 | O'Donnell ..................... 725/76 |
| 2003/0084451 A1 | 5/2003 | Pierzga et al. ................. 725/47 |
| 2003/0093798 A1 | 5/2003 | Rogerson ....................... 725/75 |
| 2003/0208579 A1 | 11/2003 | Brady, Jr. et al. ............. 709/223 |
| 2004/0039617 A1 | 2/2004 | Maycotte et al. ................ 705/5 |
| 2005/0056696 A1 | 3/2005 | Green et al. ................... 235/384 |
| 2005/0091086 A1* | 4/2005 | Moore ............................. 705/5 |
| 2006/0010438 A1 | 1/2006 | Brady, Jr. et al. ............. 717/174 |
| 2006/0040612 A1 | 2/2006 | Min ............................. 455/12.1 |
| 2007/0168205 A1* | 7/2007 | Carlson et al. ................... 705/1 |
| 2008/0121757 A1* | 5/2008 | Pozzi et al. ................. 244/118.6 |
| 2008/0132212 A1 | 6/2008 | Lemond et al. ............. 455/414.1 |
| 2008/0133705 A1* | 6/2008 | Lemond et al. ............... 709/217 |
| 2008/0141314 A1 | 6/2008 | Lemond et al. ................. 725/76 |
| 2008/0141315 A1* | 6/2008 | Ogilvie ........................... 725/77 |
| 2008/0219154 A1 | 9/2008 | Durrey et al. ................. 370/225 |
| 2009/0112377 A1 | 4/2009 | Schalla et al. ..................... 701/3 |
| 2009/0133112 A1 | 5/2009 | Kauffman et al. ............... 726/11 |
| 2009/0187640 A1 | 7/2009 | Delia et al. .................... 709/219 |
| 2010/0070376 A1 | 3/2010 | Proud et al. ..................... 705/21 |
| 2010/0070565 A1 | 3/2010 | Leblanc et al. ............... 709/203 |
| 2010/0138582 A1 | 6/2010 | Bird et al. ..................... 710/303 |
| 2010/0162325 A1* | 6/2010 | Bonar ............................. 725/76 |
| 2011/0107377 A1 | 5/2011 | Petrisor et al. .................. 725/76 |
| 2011/0196754 A1 | 8/2011 | Proud et al. ..................... 705/16 |
| 2012/0030708 A1 | 2/2012 | Margis et al. ................... 725/38 |
| 2012/0298737 A1* | 11/2012 | Thakar et al. ................. 235/375 |
| 2013/0005336 A1 | 1/2013 | Ayotte et al. ............... 455/435.1 |
| 2013/0117338 A1 | 5/2013 | Lynch et al. .................. 707/827 |
| 2013/0139269 A1 | 5/2013 | Shaikh et al. ................... 726/26 |
| 2013/0149958 A1 | 6/2013 | Davis et al. .................. 455/12.1 |

OTHER PUBLICATIONS

Liu-Kwan, In-Flight ENtertainment: The Sky's the Limit, Entertainment Computing, Oct. 2000, pp. 98-101.*

* cited by examiner

ADMINISTRATION AND CUSTOMIZATION PLATFORM FOR IN-VEHICLE SERVICES

FIELD OF THE DISCLOSURE

This disclosure relates generally to an administration and customization platform for in-vehicle services provided to passengers, where the customization of in-vehicle services may span multiple transit providers.

BACKGROUND

Transit providers, such as taxi companies, limousine companies, bus companies, railway companies, airlines, etc., may install in-vehicle entertainment and service systems in their vehicles to entertain their passengers, to enable attendants to better serve the passengers, etc., during transit on the vehicles. For example, commercial planes are generally equipped with in-flight entertainment (IFE) systems to accommodate their passengers' desire for entertainment while in-transit to their destinations. However, among other issues, typical IFE systems do not offer in-vehicle services that are specifically targeted for their individual passengers. In addition, passengers do not always travel using the same carriers. Because information learned by a carrier about passengers is generally not shared to other carriers, preference information (if any) determined for passengers may not be optimal.

SUMMARY

One aspect of the disclosure relates to a system configured to facilitate in-vehicle-services-related tracking of passengers, in accordance with one or more implementations. In exemplary implementations, information indicating one set of selections of in-vehicle services made from a user-provided device during transit on one trip may be obtained from one in-vehicle computer system that processed the one set of selections. Information indicating one other set of selections of in-vehicle services made from the user-provided device during transit on one other trip may be obtained from one other in-vehicle computer system that processed the one other set of selections.

The information indicating the one set of selections may be obtained along with identification information for the one set of selections. The information indicating the one other set of selections may be obtained along with identification information for the one other set of selections. The one set of selections may be determined to be related to one trip taken by a particular passenger. The one other set of selections may be determined to be related to one other trip taken by the particular passenger. Based on the determination regarding the one set of selections and the one other set of selections, preference information of the particular passenger may be determined using the information indicating the one set of selections and the one other set of selections. In some implementations, the information indicating the sets of selections made from the user-provided device may be utilized along with other information obtained via other approaches to determine the preference information of the particular passenger. For example, a transit provider may utilize the indication indicating the sets of selections along with other information that the transit provide knows about the passenger (e.g., purchases, rentals, or service requests of passengers may be inputted by attendants, information may be obtained from selections of in-vehicle services made by passengers at other devices, information about passengers may be collected from other sources, etc.). In this way, among other benefits, preference information for individual passengers may be derived from selections made by the individual passengers on different trips (e.g., with the same or different carriers) to provide a more complete view with respect to passenger preferences.

In some implementations, the system may include one or more servers. The server(s) may be configured to communicate with one or more client computing devices according to a client/server architecture. The users may access the system via the client computing devices. The client computing devices may include one or more user-provided devices.

The server(s) may be configured to execute one or more computer program modules to facilitate in-vehicle-services-related tracking of passengers. The computer program modules may include one or more of an information manager module, an identity determination module, a preference determination module, a carrier manager module, and/or other modules.

The information manager module may be configured to obtain a first set of information comprising first identification information and one or more first trip details and a second set of information comprising second identification information and one or more second trip details.

In certain implementations, the information manager module may be configured to obtain the first set of information or the second set of information from one or more applications on one or more user-provided devices. In some implementations, the information manager module may be configured to obtain the first set of information or the second set of information may be obtained from one or more in-vehicle computer systems that process selections of in-vehicle services made from a user-provided device by a passenger.

The identity determination module may be configured to determine that the first set of information relates to a first trip of a particular passenger and the second set of information relates to a second trip of the particular passenger. For example, the identity determination module may determine that the first identification information corresponds to the second identification information. The determination that the first set of information relates to the first trip and the second set of information relates to the second trip may be based on the determination that the first identification information and second identification information correspond to one another.

In certain implementations, the first identifying information may indicate a first device identifier. The second identifying information may indicate a second device identifier. The identity determination module may be configured to determine that the first set of information relates to a first trip of a particular passenger and the second set of information relates to a second trip of the particular passenger based on the first device identifier corresponding to the second device identifier. In some implementations, the identity determination module may be configured to determine that the first device identifier corresponds to the second device identifier based on the first device identifier being the same as the second device identifier.

In various implementations, the information manager module may be configured to obtain the first set of information (comprising first identification information and one or more first trip details) and the second set of information (comprising second identification information and one or more second trip details) such that one or more first selections of in-vehicle services made from a user-provided device of the particular passenger during transit of the first trip are and one or more second selections of in-vehicle services made from the user-provided device during transit of the second trip are obtained. The user-provided device may, for instance, be provided by the particular passenger during transit of the first and second trips.

In certain implementations, the carrier manager module may be configured to facilitate (i) one or more first communication sessions with a first in-vehicle computer system that processes the one or more first selections of in-vehicle services and (ii) one or more second communication sessions with a second in-vehicle computer system that processes the one or more second selections of in-vehicle services. In some implementations, the information manager module may be configured to obtain the one or more first selections of in-vehicle services from the first in-vehicle computer system via the one or more first communication sessions and obtain the one or more second selections of in-vehicle services from the second in-vehicle computer system via the one or more second communication sessions.

In various implementations, the first set of information may relate to a first carrier, and the second set of information may relate to a second carrier that is different from the first carrier. In some implementations, the information manager module may be configured to obtain the first set of information (comprising first identification information and one or more first trip details) from a first branded application indicating a brand association with the first carrier. The information manager module may be configured to obtain the second set of information (comprising second identification information and one or more second trip details) from a second branded application indicating a brand association with the second carrier.

In certain implementations, the identity determination module may be configured to determine that the first set of information relates to a first trip of a particular passenger with the first carrier and the second set of information relates to a second trip of the particular passenger with the second carrier. In some implementations, the identity determination module may be configured to determine that the first set of information relates to the first trip and the second set of information relates to the second trip based on a determination by the identity determination module that the first identification information (of the first set of information) corresponds to the second identification information (of the second set of information).

The preference determination module may be configured to determine preference information of the particular passenger based on the one or more first trip details (of the first set of information) and the one or more second trip details (of the second set of information).

In various implementations, the one or more first trip details may indicate a duration of the first trip. The one or more second trip details may indicate a duration of the second trip. In one implementation, the preference determination module may be configured to determine first preference information of the particular passenger corresponding to the duration of the first trip and second preference information of the particular passenger corresponding to the duration of the second trip such that different preference information corresponds to different durations of trips.

In some implementations, the one or more first trip details may indicate a type of the first trip. The one or more second trip details may indicate a type of the second trip. In one implementation, the preference determination module may be configured to determine third preference information of the particular passenger corresponding to the type of the first trip and fourth preference information of the particular passenger corresponding to the type of the second trip such that different preference information corresponds to different types of trips. By way of example, types of trips may include a domestic trip or an international trip.

In certain implementations, a user-provided device may be utilized by passengers to make selections of in-vehicle services. Thus, in some implementations, the one or more first trip details may indicate one or more in-vehicle service selections requested by the particular passenger during transit of the first trip. The one or more second trip details may indicate one or more in-vehicle service selections requested by the particular passenger during transit of the second trip. In one implementation, the preference determination module may determine the preference information of the particular passenger such that one or more preferences relating to the in-vehicle service selections requested by the particular passenger during the first or second trips are determined in association with one or more of the durations of trips or the types of trips traveled by the particular passenger. As noted, the in-vehicle service selections may include one or more selections of content items or accommodations made by the particular passenger during the first or second trips.

In various implementations, the first identifying information (of the first set of information) may indicate (i) the first device identifier and (ii) a first account associated with the particular passenger and the first carrier. The second identifying information (of the second set of information) may indicate (i) the second device identifier and (ii) a second account associated with the particular passenger and the second carrier. In one implementation, the information manager module may be configured to obtain a third set of information relating to the first carrier. The third set of information may comprise third identification information and one or more third trip details. The third identification information may indicate (i) a third device identifier different from the first device identifier and (ii) a third account associated with the particular passenger and the first carrier. In some implementations, the identity determination module may be configured to determine that the third set of information relates to a third trip of the particular passenger with the first carrier based on a determination by the identity determination module that the first account corresponds to the third account.

In certain implementations, the preference determination module may be configured to determine the preference information of the particular passenger based on the one or more third trip details (of the first set of information), the one or more third trip details (of the second set of information), and/or the one or more third trip details (of the third set of information). The carrier manager module may be configured to provide the preference information to the first carrier or the second carrier.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
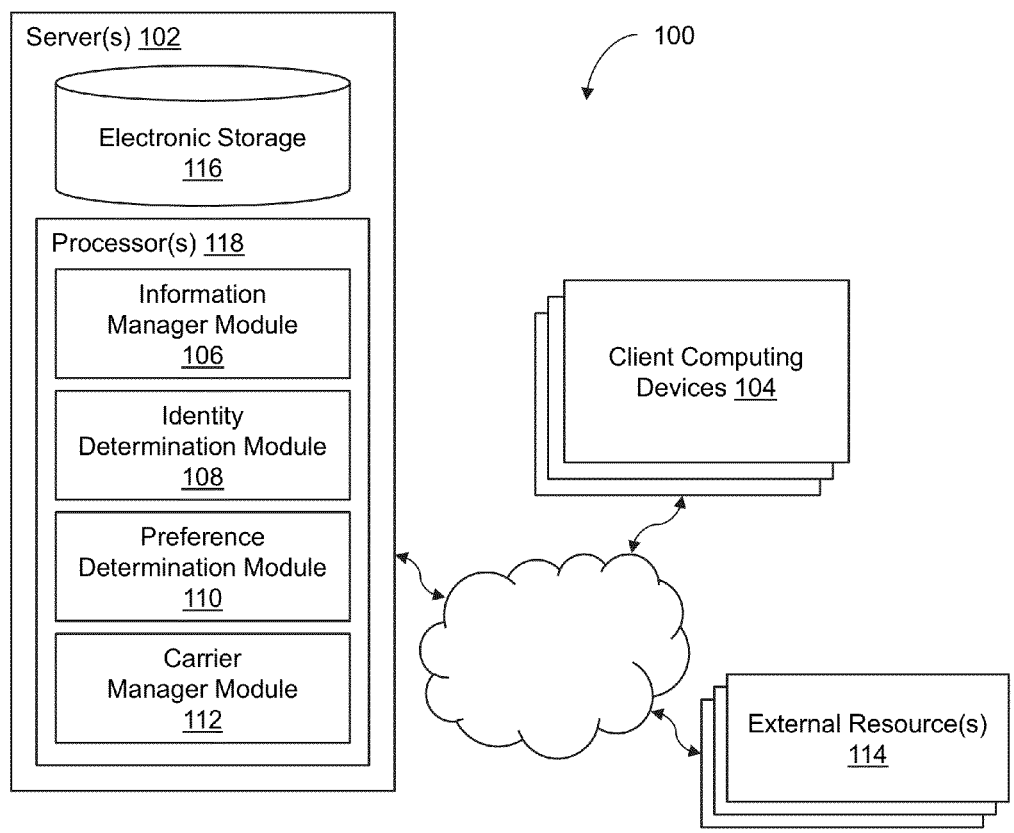
FIG. 1 illustrates a system configured to facilitate in-vehicle-services-related tracking of passengers, in accordance with one or more implementations.

FIG. 1 illustrates a system 100 configured to facilitate in-vehicle-services-related tracking of passengers, in accordance with one or more implementations. In some implementations, system 100 may include one or more servers 102. Server(s) 102 may be configured to communicate with one or more client computing devices 104 according to a client/server architecture. The users may access system 100 via client computing devices 104. Client computing devices 104 may include one or more user-provided devices.

As used herein, a user-provided device is provided by a user during transit on a vehicle (e.g., a user-provided device may be owned by the user and brought onto the vehicle by the user, may be owned by a transit provider and rented by the user, etc.). The user-provided device may include applications for in-vehicle services as well as other user applications unrelated to the in-vehicle services. The user-provided device may not be a dedicated device for use with the in-vehicle computer system. By way of example, the one or more user-provided devices may include one or more of laptop computers, tablet computers, netbooks, smartphones, or other computing devices that are provided by one or more users during transit on a vehicle.

Server(s) 102 may be configured to execute one or more computer program modules to facilitate in-vehicle-services-related tracking of passengers. The computer program modules may include one or more of an information manager module 106, an identity determination module 108, a preference determination module 110, a carrier manager module 112, and/or other modules.

Information manager module 106 may be configured to obtain a first set of information comprising first identification information and one or more first trip details and a second set of information comprising second identification information and one or more second trip details. In one implementation, trip details may indicate whether and which in-vehicle service selections were requested by one or more passengers in relation to transit via one or more vehicles, one or more carriers, etc. Trip details may, for instance, indicate: (1) that no in-vehicle services were selected by a passenger during transit via one carrier; (2) that no in-vehicle services were selected by a passenger during transits of specific trip durations or trip types; (3) which in-vehicle services were selected by the passenger during transit using another carrier; (4) which in-vehicle services were selected by the passenger during transit using a third carrier; (5) which in-vehicle services were selected by the passenger during transits of specific trip durations or trip types; or (6) other trip-related details. As used herein, a carrier is an individual, an organization, or other entity that provides transport for one or more passengers.

In certain implementations, information manager module 106 may be configured to obtain the first set of information or the second set of information from one or more applications on one or more user-provided devices. In some implementations, information manager module 106 may be configured to obtain the first set of information or the second set of information may be obtained from one or more in-vehicle computer systems that process selections of in-vehicle services made from a user-provided device by a passenger. In-vehicle service selections may, for instance, include selections of content items or accommodations. Accommodations may include assistance, service items, food, beverages, lodging, or other accommodations.

Figure 2:
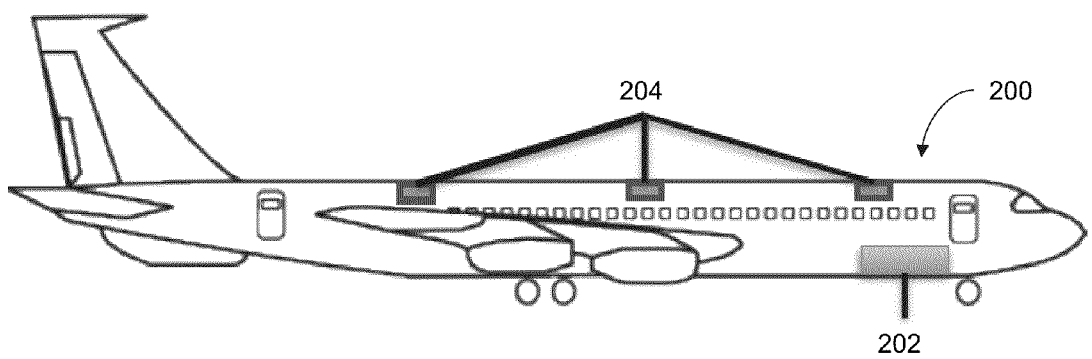
FIG. 2 illustrates a diagram of an in-vehicle computer system on a vehicle, in accordance with one or more implementations.

For example, FIG. 2 illustrates a diagram of an in-vehicle computer system 200 on a vehicle (e.g., a plane), in accordance with one or more implementations. As shown, in-vehicle computer system 200 includes an electronic equipment (EE) bay 202 and wireless access points (WAPs) 204. EE bay 202 may include one or more servers for facilitating in-vehicle services to passengers via their user-provided devices or other devices. The servers of EE bay 202 may be configured to store one or more content items, for instance, to enable passengers of the user-provided devices to obtain access to the one or more content items without an Internet connection or otherwise a connection to a network external to the vehicle. In-vehicle computer system 200 may utilize WAPs 204 to facilitate one or more communication sessions through which in-vehicle computer system 200 may communicate with the one or more user-provided devices or other devices, or through which the one or more user devices may communicate with in-vehicle computer system 200, one or more other user-provided devices, or other devices.

As discussed, still referring to FIG. 2, companies or other entities may equip their transit vehicles with in-vehicle computer systems to facilitate in-vehicles services for their passengers. However, a number of issues associated with typical in-vehicle computer systems exist. By way of example, typical IFE systems installed on commercial planes are expensive, complex, heavy, and/or behind current consumer electronics technology. Airlines using seatback controls and displays, overhead displays, or other devices that are dedicated to the IFE system, for instance, may be locked into using the same hardware for a substantial time due to costs, compatibility, or other issues. In-vehicle computer system 200 may enable airlines to overcome or otherwise reduce these issues. For example, in-vehicle computer system 200 may help airlines avoid or otherwise reduce costs associated with purchasing, installing, or maintaining user equipment because their passengers may bring their own generally-applicable devices to interact with in-vehicle computer system 200.

Figure 3A:
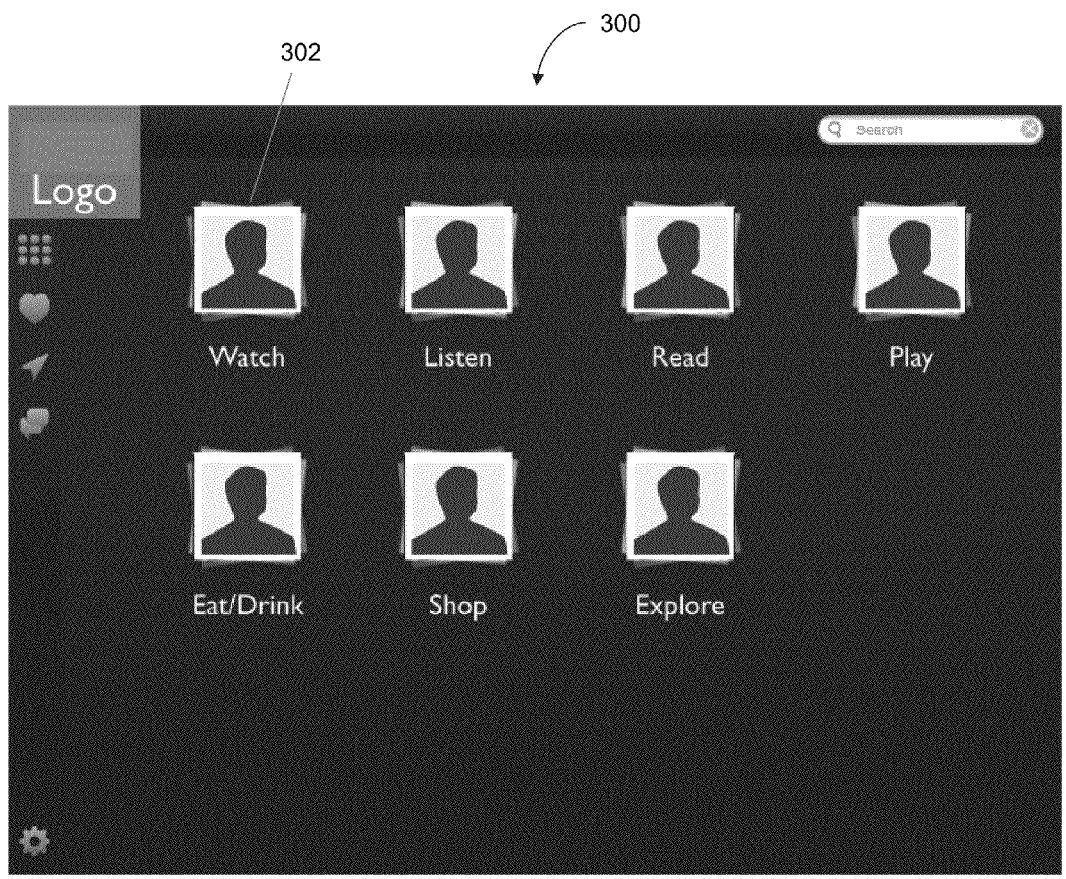
FIGS. 3A and 3B illustrate diagrams of a user interface of an application on a user-provided device for facilitating in-vehicle services, in accordance with one or more implementations.
Figure 3B:
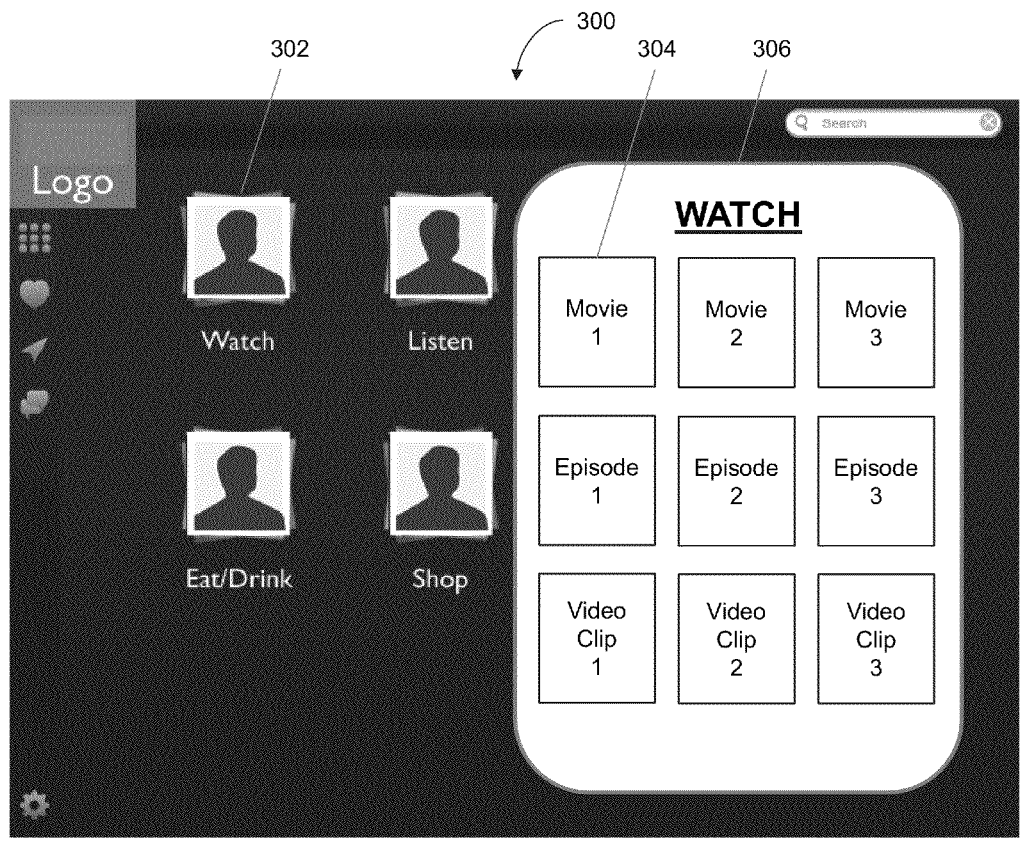

Along these lines, FIGS. 3A and 3B illustrate diagrams of a user interface 300 of an application (e.g., a passenger application) on a user-provided device, in accordance with one or more implementations. As shown, with respect to FIG. 3A, user interface 300 includes options 302 (e.g., watch, listen, read, play, eat/drink, shop, explore, etc.) relating to in-vehicle services. In one scenario, the user may select the "eat/drink" option 302 to order a snack, meal, or beverage. User interface 300 may, for instance, activate a menu for the user to select and order a snack, meal, or beverage. As a result, the application of the user-provided device may provide the user's selection/order as part of an accommodation request to the in-vehicle computer system. In such a scenario, the in-vehicle service selections may include the selection/order of the ordered snack, meal, or beverage.

In another scenario, with respect to FIG. 3B, a user may indicate (using her user-provided device) that she wants to access content items that may be watched (e.g., by selecting "watch" option 302). As such, the application associated with user interface 300 may send a request for watchable content items 304 to the in-vehicle computer system. In response, the in-vehicle computer system may provide (to the application) a list of watchable content items 304 that may be streamed or downloaded by the user. As such, the application may cause user interface 300 to present a window 306 that includes watchable content items 304 based on the provided list. If, for instance, the user selects "Movie 1," the in-vehicle computer system may provide access to the watchable content item 304 associated with "Movie 1" to the user-provided device via an established communication session between the in-vehicle computer system and the user-provided device. Thus, the in-vehicle service selections may include the selection of "watch" option 302 or the watchable content item 304 associated with "Movie 1."

Referring back to FIG. 1, identity determination module 108 may be configured to determine that the first set of information relates to a first trip of a particular passenger and the second set of information relates to a second trip of the particular passenger. For example, identity determination module 108 may determine that the first identification information corresponds to the second identification information. The determination that the first set of information relates to the first trip and the second set of information relates to the second trip may be based on the determination that the first identification information and second identification correspond to one another.

In certain implementations, the first identifying information may indicate a first device identifier. The second identifying information may indicate a second device identifier. Identity determination module 108 may be configured to determine that the first set of information relates to a first trip of a particular passenger and the second set of information relates to a second trip of the particular passenger based on the first device identifier corresponding to the second device identifier. In some implementations, identity determination module 108 may be configured to determine that the first device identifier corresponds to the second device identifier based on the first device identifier being the same as the second device identifier. In this way, for instance, the first information set and the second information set may be associated with the particular passenger regardless of different applications being used to make in-vehicle service selections, different in-vehicle computer systems receiving the in-vehicle service selections, different carriers being used by the particular passenger for travel, different user-provided devices used by the particular passenger (e.g., account information may be used in addition to or as an alternative to device identifiers), etc.

As an example, with respect to FIGS. 3A and 3B, the user may utilize user interface 300 to order a snack, meal, or beverage during the first trip and then utilize user interface 300 to access a watchable content item 304 during the second trip. In each use, the selections associated with the order or a request for the content access may be provided to the in-vehicle computer system along with a device identifier associated with the user-provided device hosting user interface 300. For example, the device identifier may include a machine address code (MAC) or other device identifier associated with the user-provided device. If, for instance, the device identifiers that are provided along with the selections are the same, identity determination module 108 may determine that the device identifier provided with the order corresponds to the device identifier, identity information module 108 may determine that the same passenger (e.g., the user of user interface 300) is associated with both selections.

Thus, in various implementations, information manager module 106 may be configured to obtain the first set of information (comprising first identification information and one or more first trip details) and the second set of information (comprising second identification information and one or more second trip details) such that one or more first selections of in-vehicle services made from a user-provided device of the particular passenger during transit of the first trip are and one or more second selections of in-vehicle services made from the user-provided device during transit of the second trip are obtained. The user-provided device may, for instance, be provided by the particular passenger during transit of the first and second trips.

In certain implementations, carrier manager module 112 may be configured to facilitate (i) one or more first communication sessions with a first in-vehicle computer system that processes the one or more first selections of in-vehicle services and (ii) one or more second communication sessions with a second in-vehicle computer system that processes the one or more second selections of in-vehicle services. In some implementations, information manager module 106 may be configured to obtain the one or more first selections of in-vehicle services from the first in-vehicle computer system via the one or more first communication sessions and obtain the one or more second selections of in-vehicle services from the second in-vehicle computer system via the one or more second communication sessions. By way of example, carrier manager module 112 may work with one or more carrier computer systems to establish the communication sessions with the first in-vehicle computer system (e.g., of a first vehicle) and the second in-vehicle computer system (e.g., of a second vehicle).

In various implementations, the first set of information may relate to a first carrier, and the second set of information may relate to a second carrier that is different from the first carrier. As discussed, for instance, carrier manager module 112 may interact with one or more carrier computer systems to establish communication sessions with in-vehicle computer systems of one or more carriers to enable information manager module 106 to obtain information sets comprising identification information and trip details that indicate whether and which in-vehicle service selections were requested by one or more passengers in relation to transit via one or more vehicles, one or more carriers, etc. Additionally, or alternatively, information manager module 108 may obtain the information sets without needing to establish the communication sessions with the in-vehicle computer systems. For example, information manager module 106 may obtain the information sets from one or more databases of the carrier computer systems, directly from one or more user-provided devices, or one or more other sources. It should be noted that, in certain implementations, the first set of information and the second set of information may relate to the same carrier.

In some implementations, information manager module 106 may be configured to obtain the first set of information (comprising first identification information and one or more first trip details) from a first branded application indicating a brand association with the first carrier. Information manager module 106 may be configured to obtain the second set of information (comprising second identification information and one or more second trip details) from a second branded application indicating a brand association with the second carrier.

In one use case, for instance, a passenger may utilize an "Airline A" application on her user-provided device to make in-vehicle service selections during a first trip on board a vehicle operated by the "Airline A" carrier. The passenger may utilize an "Airline B" application on her user-provided device to make in-vehicle service selections during a second trip on board a vehicle operated by the "Airline B" carrier. Each of the "Airline A" and the "Airline B" applications may directly or indirectly provide identification information and the passenger's in-vehicle service selections made during the respective first and second trips to the server(s) 102 (e.g., via an Internet connection, via the in-vehicle computer systems on board the vehicles, etc.). Upon obtaining information sets comprising identification information and the in-vehicle service selections, information manager module 106 may interact with identity information module 108 to determine that the information sets relate to the passenger's trip with the "Airline A" carrier and the passenger's trip with the "Airline B" carrier. As such, those information sets may be utilized to determine preference information associated with the passenger.

As indicated, in certain implementations, identity determination module 108 may be configured to determine that the first set of information relates to a first trip of a particular passenger with the first carrier and the second set of information relates to a second trip of the particular passenger with the second carrier. As discussed, in some implementations, identity determination module 108 may be configured to determine that the first set of information relates to the first trip and the second set of information relates to the second trip based on a determination by identity determination module 108 that the first identification information (of the first set of information) corresponds to the second identification information (of the second set of information).

Preference determination module 110 may be configured to determine preference information of the particular passenger based on the one or more first trip details (of the first set of information) and the one or more second trip details (of the second set of information).

In various implementations, the one or more first trip details may indicate a duration of the first trip. The one or more second trip details may indicate a duration of the second trip. In one implementation, preference determination module 110 may be configured to determine first preference information of the particular passenger corresponding to the duration of the first trip and second preference information of the particular passenger corresponding to the duration of the second trip such that different preference information corresponds to different durations of trips.

In one use case, with respect to FIG. 3B, a passenger may generally select to access watchable content items 304 that are comical during trips that are less than one hour. On the other hand, the passenger may generally select to access watchable content items 304 that are dramatic when the trips are for more than one hour. The first trip may have, for instance, lasted for less than one hour, and the passenger may have selected to watch only comical watchable content items 304 during the first trip. The second trip may have lasted for more than one hour, and the passenger may have selected to watch mostly dramatic watchable content items 304. Based on these selections during the first and second trips, the first preference information determined by preference determination module 110 may indicate that the passenger has a strong preference (e.g., 10/10 rating) for comedic content during trips that are less than one hour, and the second preference information determined by preference determination module 110 may indicate that the passenger has a relatively strong preference (e.g., 8/10 rating) for dramatic content during trips that are greater than one hour. In this way, for instance, the preference information may be utilized to customize content items (or other in-vehicle service selections) for the particular passenger during transit associated with trips of different duration.

In some implementations, the one or more first trip details may indicate a type of the first trip. The one or more second trip details may indicate a type of the second trip. In one implementation, preference determination module 110 may be configured to determine third preference information of the particular passenger corresponding to the type of the first trip and fourth preference information of the particular passenger corresponding to the type of the second trip such that different preference information corresponds to different types of trips. By way of example, types of trips may include a domestic trip or an international trip (e.g., short-haul domestic, long-haul domestic, short-haul international, long-haul international, etc.).

In one scenario, a passenger may generally initiate a request for a blanket during transits associated with long-haul domestic trips. On the other hand, the passenger may generally not initiate requests for blankets during transit associated with long-haul international trips, for instance, because the passenger brings her own blanket for long-haul international trips. The passenger may have repeated these requests or non-requests during transits associated with the first and second trips. As such, the third preference information determined by the preference determination module 110 may indicate that the passenger has a preference for blankets during long-haul domestic trips, and the fourth preference indication determined by the preference determination module 110 may indicate that the passenger has a preference not to have blankets during long-haul international trips. As such, attendants of carriers that are provided the preference information of the particular passenger may know to offer the passenger a blanket during long-haul domestic flights without the passenger having to ask, and the attendants may know not to offer the passenger a blanket during long-haul international flights.

As mentioned, in certain implementations, a user-provided device may be utilized by passengers to make selections of in-vehicle services. Thus, in some implementations, the one or more first trip details may indicate one or more in-vehicle service selections requested by the particular passenger during transit of the first trip. The one or more second trip details may indicate one or more in-vehicle service selections requested by the particular passenger during transit of the second trip. In one implementation, preference determination module 110 may determine the preference information of the particular passenger such that one or more preferences relating to the in-vehicle service selections requested by the particular passenger during the first or second trips are determined in association with one or more of the durations of trips or the types of trips traveled by the particular passenger. As noted, the in-vehicle service selections may include one or more selections of content items or accommodations made by the particular passenger during the first or second trips.

In various implementations, the first identifying information (of the first set of information) may indicate (i) the first device identifier and (ii) a first account associated with the particular passenger and the first carrier. The second identifying information (of the second set of information) may indicate (i) the second device identifier and (ii) a second account associated with the particular passenger and the second carrier. In one implementation, information manager module 106 may be configured to obtain a third set of information relating to the first carrier. The third set of information may comprise third identification information and one or more third trip details. The third identification information may indicate (i) a third device identifier different from the first device identifier and (ii) a third account associated with the particular passenger and the first carrier. In some implementations, identity determination module 108 may be configured to determine that the third set of information relates to a third trip of the particular passenger with the first carrier based on a determination by identity determination module 108 that the first account corresponds to the third account. In this way, for instance, information sets may be associated with a passenger even if the passenger utilizes different devices to make her in-vehicle service selections.

As such, in certain implementations, preference determination module 110 may be configured to determine the preference information of the particular passenger based on the one or more third trip details (of the first set of information), the one or more third trip details (of the second set of information), and/or the one or more third trip details (of the third set of information).

Carrier manager module 112 may be configured to provide the preference information to the first carrier or the second carrier. In one use case, the first carrier or the second carrier may utilize the preference information of the particular passenger to customize in-vehicle services for the particular passenger. For example, the first carrier or the second carrier may utilize the preference information to better upsell services items (e.g., in customized packages specifically targeted for the particular passenger), to provide access to content items that the particular passenger likes (e.g., an "Amuse Me" functionality of an application may choose content for the passenger based on the preference information), to provide more relevant advertisements to the particular passenger, or otherwise to provide the particular passenger with a better transit experience. It should be noted that, in some implementations, carrier manager module 112 (or another module) may provide the preference information to other entities. For example, the preference information may be provided to third parties so that the third parties may develop applications based on the preference information.

Co-pending patent application, filed concurrently herewith, entitled "IN-VEHICLE SERVICES FOR USER-PROVIDED DEVICES," U.S. patent application Ser. No. 13/843,864, co-pending patent application, filed concurrently herewith, entitled "IN-VEHICLE SERVICES THROUGH ATTENDANT DEVICES, USER-PROVIDED DEVICES, AND/OR AN IN-VEHICLE COMPUTER SYSTEM," U.S. patent application Ser. No. 13/843,990, and co-pending patent application, filed concurrently herewith, entitled "PRE-TRANSIT AND POST-TRANSIT FACILITATION OF IN-VEHICLE SERVICES," U.S. patent application Ser. No. 13/844,089, are all incorporated by reference in their entireties herein.

Server(s) 102, client computing devices 104, external resources 114, and/or other components may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 102, client computing devices 104, external resources 114, and/or other components may be operatively linked via some other communication media.

A given client computing device 104 may include one or more processors configured to execute computer program modules. The computer program modules may be configured to enable an expert or user associated with client computing device 104 to interface with system 100 and/or external resources 114, and/or provide other functionality attributed herein to client computing devices 104. By way of example, client computing device 104 may include one or more of a desktop computer, a laptop computer, a tablet computer, a netbook, a smartphone, or other computing devices.

External resources 114 may include sources of information, hosts and/or providers outside of system 100, external entities participating with system 100, and/or other resources. In some implementations, some or all of the functionality attributed herein to external resources 114 may be provided by resources included in system 100.

In some implementations, server(s) 102 may include an electronic storage 116, one or more processor(s) 118, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 116 may comprise non-transitory storage media that electronically stores information. The electronic storage media of electronic storage 116 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 116 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 116 may include one or more virtual storage resources (e.g., cloud storage, a virtual private network, and/or other virtual storage resources). Electronic storage 116 may store software algorithms, information determined by processor(s) 118, information received from server(s) 102, information received from client computing devices 104, and/or other information that enables server(s) 102 to function as described herein.

Processor(s) 118 is configured to provide information processing capabilities in server(s) 102. As such, processor(s) 118 may include one or more of a digital processor, an analog processor, a digital circuit designed to process information, an analog circuit designed to process information, a state machine, and/or other mechanisms for electronically processing information. Although processor(s) 118 is shown in FIG. 1 as a single entity, this is for illustrative purposes only. In some implementations, processor(s) 118 may include a plurality of processing units. These processing units may be physically located within the same device, or processor(s) 118 may represent processing functionality of a plurality of devices operating in coordination. Processor(s) 118 may be configured to execute modules 106, 108, 110, 112, and/or other modules. Processor(s) 118 may be configured to execute modules 106, 108, 110, 112, and/or other modules by software; hardware; firmware; some combination of software, hardware, and/or firmware; and/or other mechanisms for configuring processing capabilities on processor(s) 118.

It should be appreciated that although modules 106, 108, 110, and 112 are illustrated in FIG. 1 as being co-located within a single processing unit, in implementations in which processor(s) 118 includes multiple processing units, one or more of modules 106, 108, 110, and/or 112 may be located remotely from the other modules. The description of the functionality provided by the different modules 106, 108, 110, and/or 112 described below is for illustrative purposes, and is not intended to be limiting, as any of modules 106, 108, 110, and/or 112 may provide more or less functionality than is described. For example, one or more of modules 106, 108, 110, and/or 112 may be eliminated, and some or all of its functionality may be provided by other ones of modules 106, 108, 110, and/or 112. As another example, processor(s) 118 may be configured to execute one or more additional modules that may perform some or all of the functionality attributed below to one of modules 106, 108, 110, and/or 112.

Figure 4:
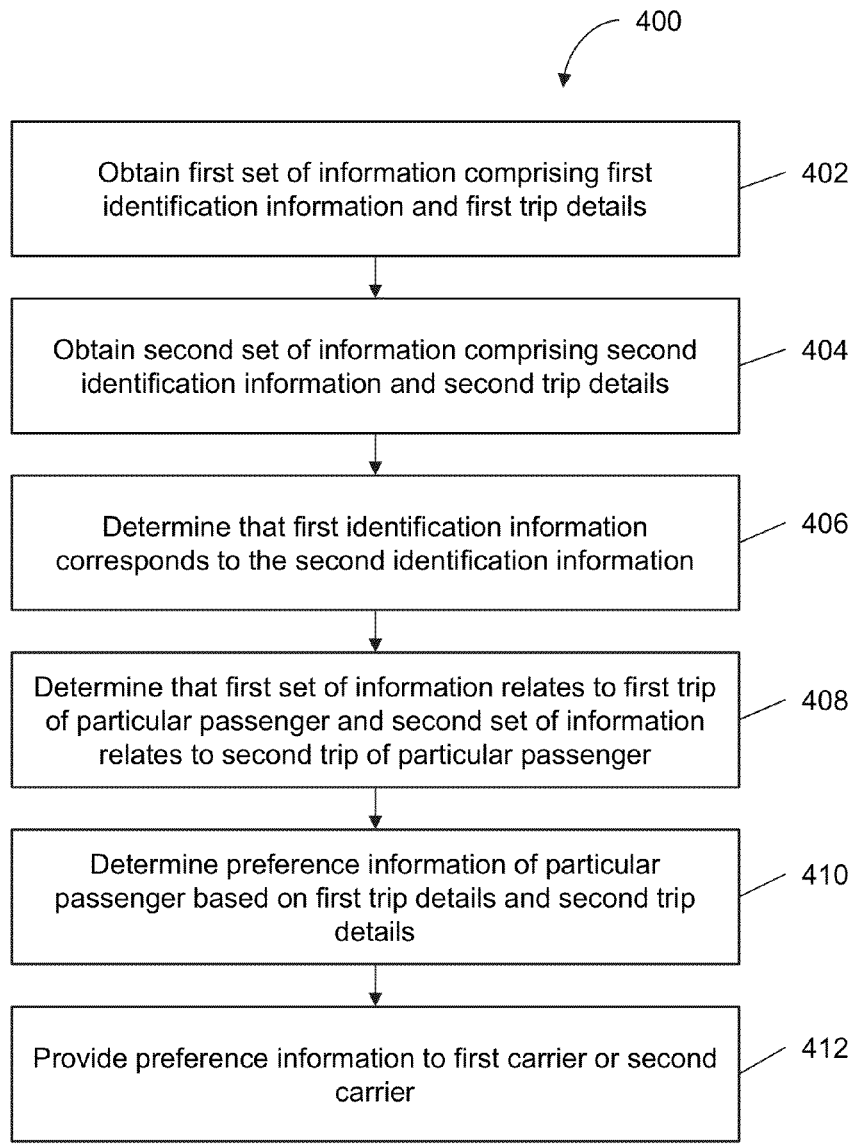
FIG. 4 illustrates a method for facilitating in-vehicle-services-related tracking of passengers, in accordance with one or more implementations.

FIG. 4 illustrates a method for facilitating in-vehicle-services-related tracking of passengers, in accordance with one or more implementations. The operations of method 400 presented below are intended to be illustrative. In some implementations, method 400 may be accomplished with one or more additional operations not described, and/or without one or more of the operations discussed. Additionally, the order in which the operations of method 400 are illustrated in FIG. 4 and described below is not intended to be limiting.

In some implementations, method 400 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 400 in response to instructions stored electronically on an electronic storage medium. The one or more processing devices may include one or more devices configured through hardware, firmware, and/or software to be specifically designed for execution of one or more of the operations of method 400.

At an operation 402, a first set of information comprising first identification information and one or more first trip details may be obtained. Operation 402 may be performed by an information manager module that is the same as or similar to information manager module 106, in accordance with one or more implementations.

At an operation 404, a second set of information comprising second identification information and one or more second trip details may be obtained. Operation 404 may be performed by an information manager module that is the same as or similar to information manager module 106, in accordance with one or more implementations.

In certain implementations, with respect to operations 402 and 404, the first set of information or the second set of information may be obtained from one or more applications on one or more user-provided devices. In some implementations, the first set of information or the second set of information may be obtained from one or more in-vehicle computer systems that process selections of in-vehicle services made from a user-provided device by a passenger.

At an operation 406, the first identification information may be determined to correspond to the second identification information. In certain implementations, the first identification information may indicate a first device identifier and the second identification information may indicate a second device identifier. The first identification information may be determined to correspond to the second identification information based on a determination that the first device identifier corresponds to the second device identifier. In some implementations, the determination that the first device identifier corresponds to the second device identification may be based on a determination that the first device identifier is the same as the second device identifier. Operation 406 may be performed by an identity determination module that is the same as or similar to identity determination module 108, in accordance with one or more implementations.

In various implementations, with respect to operation 406, the first identification information may indicate a first account and the second identification information may indicate a second account. The determination that the first identification information corresponds to the second identification information may be based on a determination that the first account corresponds to the second account (e.g., the first and second accounts are the same account, the first and second accounts correspond to the same passenger, etc.).

At an operation 408, the first set of information may be determined to relate to a first trip of a particular passenger and the second set of information may be determined to relate to a second trip of the particular passenger. As shown, in some implementations, the determination that the first set of information relates to the first trip of the particular passenger and the second set of information relates to the second trip of the particular passenger may be responsive to the determination at operation 406 that the first identification information corresponds to the second identification information. Operation 408 may be performed by an identity determination module that is the same as or similar to identity determination module 108, in accordance with one or more implementations.

At an operation 410, preference information of the particular passenger may be determined based on the one or more first trip details and the one or more second trip details. Operation 410 may be performed by a preference determination module that is the same as or similar to preference determination module 110, in accordance with one or more implementations.

In certain implementations, with respect to operation 410, the one or more first trip details may indicate a duration of the first trip. The one or second trip details may indicate a duration of the second trip. The preference information may be determined based on a determination of first preference information of the particular passenger corresponding to the duration of the first trip and a determination of second preference information of the particular passenger corresponding to the duration of the second trip such that different preference information corresponds to different durations of trips.

In various implementations, with respect to operation 410, the one or more first trip details may indicate a type of the first trip. The one or more second trip details may indicate a type of the second trip. The preference information may be determined based on a determination of third preference information of the particular passenger corresponding to the type of the first trip and a determination of fourth preference information of the particular passenger corresponding to the type of the second trip. Types of trips may, for instance, indicate one or more of a domestic trip or an international trip.

In some implementations, with respect to operation 410, the one or more first trip details may indicate one or more in-vehicle service selections requested by the particular passenger during transit of the first trip. The one or more second trip details may indicate one or more in-vehicle service selections requested by the particular passenger during transit of the second trip. The preference information may be determined based on a determination of one or more preferences relating to the in-vehicle service selections requested by the particular passenger during the first or second trips in association with one or more of the durations of trips or the types of trips traveled by the particular passenger. The in-vehicle service selections may, for instance, include one or more selections of content items or accommodations made by the particular passenger during the first or second trips.

At an operation 412, the preference information may be provided to the first carrier or the second carrier. Operation 412 may be performed by a carrier manager module that is the same as or similar to carrier manager module 112, in accordance with one or more implementations.

Figure 5:
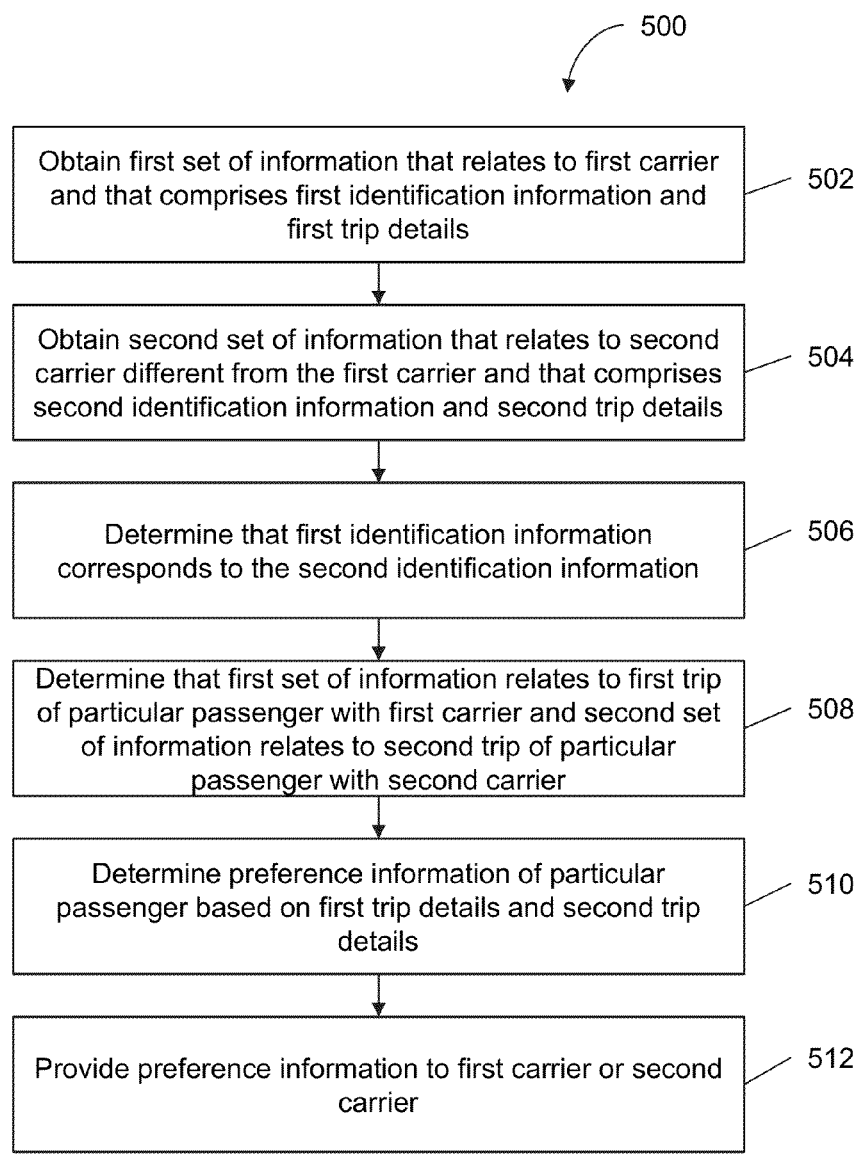
FIG. 5 illustrates a method for facilitating in-vehicle-services-related cross-carrier tracking of passengers, in accordance with one or more implementations.

FIG. 5 illustrates a method for facilitating in-vehicle-services-related cross-carrier tracking of passengers, in accordance with one or more implementations. The operations of method 500 presented below are intended to be illustrative. In some implementations, method 500 may be accomplished with one or more additional operations not described, and/or without one or more of the operations discussed. Additionally, the order in which the operations of method 500 are illustrated in FIG. 5 and described below is not intended to be limiting.

In some implementations, method 500 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 500 in response to instructions stored electronically on an electronic storage medium. The one or more processing devices may include one or more devices configured through hardware, firmware, and/or software to be specifically designed for execution of one or more of the operations of method 500.

At an operation 502, a first set of information that relates to a first carrier and that comprises first identification information and one or more first trip details may be obtained. Operation 502 may be performed by an information manager module that is the same as or similar to information manager module 106, in accordance with one or more implementations.

At an operation 504, a second set of information that relates to a second carrier different from the first carrier and that comprises second identification information and one or more second trip details may be obtained. Operation 504 may be performed by an information manager module that is the same as or similar to information manager module 106, in accordance with one or more implementations.

In certain implementations, with respect to operations 502 and 504, the first set of information may be obtained from a first branded application indicating a brand association with the first carrier. The second set of information may be obtained from a second branded application indicating a brand association with the second carrier. In some implementations, the first set of information or the second set of information may be obtained from one or more in-vehicle computer systems that process selections of in-vehicle services made from a user-provided device by a passenger.

At an operation 506, the first identification information may be determined to correspond to the second identification information. In certain implementations, the first identification information may indicate a first device identifier and the second identification information may indicate a second device identifier. The first identification information may be determined to correspond to the second identification information based on a determination that the first device identifier corresponds to the second device identifier. In some implementations, the determination that the first device identifier corresponds to the second device identification may be based on a determination that the first device identifier is the same as the second device identifier. Operation 506 may be performed by an identity determination module that is the same as or similar to identity determination module 108, in accordance with one or more implementations.

At an operation 508, the first set of information may be determined to relate to a first trip of a particular passenger with the first carrier and the second set of information may be determined to relate to a second trip of the particular passenger with the second carrier. As shown, in some implementations, the determination that the first set of information relates to the first trip of the particular passenger with the first carrier and the second set of information relates to the second trip of the particular passenger with the second carrier may be responsive to the determination at operation 506 that the first identification information corresponds to the second identification information. Operation 508 may be performed by an identity determination module that is the same as or similar to identity determination module 108, in accordance with one or more implementations.

At an operation 510, preference information of the particular passenger may be determined based on the one or more first trip details and the one or more second trip details. Operation 510 may be performed by a preference determination module that is the same as or similar to preference determination module 110, in accordance with one or more implementations.

In certain implementations, with respect to operation 510, the one or more first trip details may indicate a duration of the first trip. The one or second trip details may indicate a duration of the second trip. The preference information may be determined based on a determination of first preference information of the particular passenger corresponding to the duration of the first trip and a determination of second preference information of the particular passenger corresponding to the duration of the second trip such that different preference information corresponds to different durations of trips.

In various implementations, with respect to operation 510, the one or more first trip details may indicate a type of the first trip. The one or more second trip details may indicate a type of the second trip. The preference information may be determined based on a determination of third preference information of the particular passenger corresponding to the type of the first trip and a determination of fourth preference information of the particular passenger corresponding to the type of the second trip. Types of trips may, for instance, indicate one or more of a domestic trip or an international trip.

In some implementations, with respect to operation 510, the one or more first trip details may indicate one or more in-vehicle service selections requested by the particular passenger during transit of the first trip. The one or more second trip details may indicate one or more in-vehicle service selections requested by the particular passenger during transit of the second trip. The preference information may be determined based on a determination of one or more preferences relating to the in-vehicle service selections requested by the particular passenger during the first or second trips in association with one or more of the durations of trips or the types of trips traveled by the particular passenger. The in-vehicle service selections may, for instance, include one or more selections of content items or accommodations made by the particular passenger during the first or second trips.

At an operation 512, the preference information may be provided to the first carrier or the second carrier. Operation 512 may be performed by a carrier manager module that is the same as or similar to carrier manager module 112, in accordance with one or more implementations.

Figure 6:
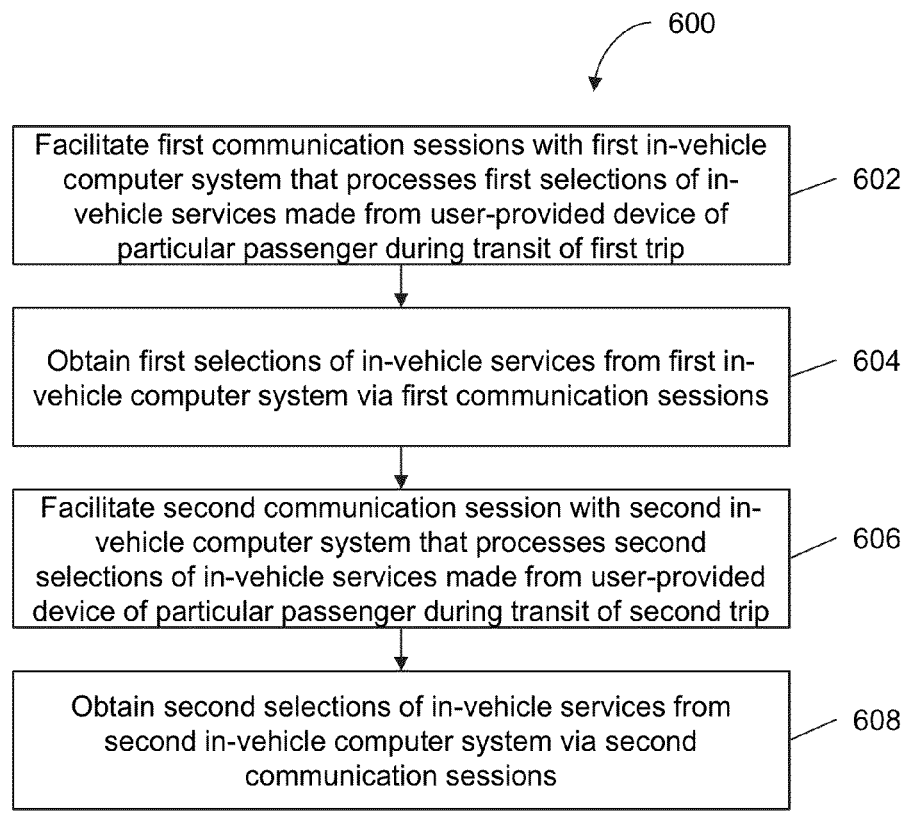
FIG. 6 illustrates a method for obtaining selections of in-vehicle services made from a user-provided device, in accordance with one or more implementations.

FIG. 6 illustrates a method for obtaining selections of in-vehicle services made from a user-provided device, in accordance with one or more implementations. The operations of method 600 presented below are intended to be illustrative. In some implementations, method 600 may be accomplished with one or more additional operations not described, and/or without one or more of the operations discussed. Additionally, the order in which the operations of method 600 are illustrated in FIG. 6 and described below is not intended to be limiting.

In some implementations, method 600 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 600 in response to instructions stored electronically on an electronic storage medium. The one or more processing devices may include one or more devices configured through hardware, firmware, and/or software to be specifically designed for execution of one or more of the operations of method 600.

At an operation 602, one or more first communication sessions with a first in-vehicle computer system that processes one or more first selections of in-vehicle services (made from a user-provided device of the particular passenger during transit of the first trip) may be facilitated. Operation 602 may be performed by a carrier manager module that is the same as or similar to carrier manager module 112, in accordance with one or more implementations.

At an operation 604, the one or more first selections of in-vehicle services may be obtained via the one or more first communication sessions. Operation 604 may be performed by an information manager module that is the same as or similar to information manager module 106, in accordance with one or more implementations.

At an operation 606, one or more second communication sessions with a second in-vehicle computer system that processes one or more second selections of in-vehicle services (made from the user-provided device of the particular passenger during transit of the second trip) may be facilitated. Operation 606 may be performed by a carrier manager module that is the same as or similar to carrier manager module 112, in accordance with one or more implementations.

At an operation 608, the one or more second selections of in-vehicle services may be obtained via the one or more second communication sessions. Operation 608 may be performed by an information manager module that is the same as or similar to information manager module 106, in accordance with one or more implementations.

In certain implementations, with respect to operations 402, 404, 502, and 504 of FIGS. 4 and 5, the one or more first selections of in-vehicle services and the one or more second selections of in-vehicle services may be obtained as at least part of the first set of information and the second set of information.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A method for facilitating cross-carrier tracking of passengers based on trip details that indicate whether and which in-vehicle service selections were requested by the passengers in relation to transit via different carriers, the method being implemented on a computer system that includes one or more physical processors executing with one or more computer program instructions which, when executed, perform the method, the method comprising:

obtaining, by the computer system, a first set of information relating to a first carrier and a second set of information relating to a second carrier that is different from the first carrier, the first set of information comprising first identification information and one or more first trip details and the second set of information comprising second identification information and one or more second trip details, wherein the first identifying information indicates a first device identifier, and a first account that is associated with the particular passenger and the first carrier, and wherein the second identifying information indicates a second device identifier, and a second account that is associated with the particular passenger and the second carrier;

determining, by the computer system, that the first set of information relates to a first trip of a particular passenger with the first carrier and the second set of information relates to a second trip of the particular passenger with the second carrier based on a determination that the first device identifier corresponds to the second device identifier;

obtaining, by the computer system, a third set of information relating to the first carrier, the third set of information comprising third identification information and one or more third trip details, wherein the third identification information indicates a third device identifier different from the first device identifier, and a third account that is associated with the particular passenger and the first carrier;

determining, by the computer system, that the third set of information relates to a third trip of the particular passenger with the first carrier based on a determination that the first account corresponds to the third account; and determining, by the computer system, preference information of the particular passenger based on the one or more first trip details, the one or more second trip details, and the one or more third trip details.

2. The method of claim 1, the method further comprising determining, by the computer system, that the first device identifier corresponds to the second device identifier based on the first device identifier being the same as the second device identifier.

3. The method of claim 1, wherein obtaining the first set of information further comprises obtaining the first set of information from a first branded application indicating a brand association with the first carrier, and wherein obtaining the second set of information further comprises obtaining the second set of information from a second branded application indicating a brand association with the second carrier.

4. The method of claim 1, the method further comprising providing, by the computer system, the preference information to the first carrier or the second carrier.

5. The method of claim 1, wherein the one or more first trip details indicate a duration of the first trip, and the one or more second trip details indicate a duration of the second trip, wherein determining the preference information comprises determining first preference information of the particular passenger corresponding to the duration of the first trip and second preference information of the particular passenger corresponding to the duration of the second trip such that different preference information corresponds to different durations of trips.

6. The method of claim 5, wherein the one or more first trip details indicate a type of the first trip, and the one or more second trip details indicate a type of the second trip, wherein determining the preference information comprises determining third preference information of the particular passenger corresponding to the type of the first trip and fourth preference information of the particular passenger corresponding to the type of the second trip such that different preference information corresponds to different types of trips, wherein types of trips include a domestic trip or an international trip.

7. The method of claim 6, wherein the one or more first trip details indicate one or more in-vehicle service selections requested by the particular passenger during transit of the first trip, and the one or more second trip details indicate one or more in-vehicle service selections requested by the particular passenger during transit of the second trip, and wherein determining the preference information further comprises determining one or more preferences relating to the in-vehicle service selections in association with one or more of the durations of trips or the types of trips traveled by the particular passenger.

8. The method of claim 7, wherein the in-vehicle service selections include one or more selections of content items or accommodations made by the particular passenger during the first or second trips.

9. The method of claim 1, wherein obtaining the first set of information and the second set of information comprises obtaining one or more first selections of in-vehicle services made from a user-provided device of the particular passenger during transit of the first trip and one or more second selections of in-vehicle services made from the user-provided device during transit of the second trip, the user-provided device being provided by the particular passenger during transit of the first and second trips.

10. The method of claim 9, the method further comprising:
facilitating, by the computer system, (i) one or more first communication sessions with a first in-vehicle computer system that processes the one or more first selections of in-vehicle services and (ii) one or more second communication sessions with a second in-vehicle computer system that processes the one or more second selections of in-vehicle services,
wherein obtaining the one or more first selections of in-vehicle services and the one or more second selections of in-vehicle services comprises obtaining the one or more first selections of in-vehicle services from the first in-vehicle computer system via the one or more first communication sessions and obtaining the one or more second selections of in-vehicle services from the second in-vehicle computer system via the one or more second communication sessions.

11. The method of claim 1, wherein the first account and the third account are determined to correspond to one another based on a determination that the first account and third account are the same account.

12. The method of claim 1, wherein the first device identifier and the second device identifier are determined to correspond to one another based on a determination that the first device identifier and the second device identifier correspond to the particular passenger.

13. A system for facilitating cross-carrier tracking of passengers based on trip details that indicate whether and which in-vehicle service selections were requested by the passengers in relation to transit via different carriers, the system comprising:
one or more physical processors programmed with one or more computer program instructions which, when executed by the one or more physical processors, cause the system to:
obtain a first set of information relating to a first carrier and a second set of information relating to a second carrier that is different from the first carrier, the first set of information comprising first identification information and one or more first trip details and the second set of information comprising second identification information and one or more second trip details, wherein the first identifying information indicates a first device identifier, and a first account that is associated with the particular passenger and the first carrier, and wherein the second identifying information indicates a second device identifier, and a second account that is associated with the particular passenger and the second carrier;
determine that the first set of information relates to a first trip of a particular passenger with the first carrier and the second set of information relates to a second trip of the particular passenger with the second carrier based on a determination that the first device identifier corresponds to the second device identifier;
obtain a third set of information relating to the first carrier, the third set of information comprising third identification information and one or more third trip details, wherein the third identification information indicates a third device identifier different from the first device identifier, and a third account that is associated with the particular passenger and the first carrier; and
determine that the third set of information relates to a third trip of the particular passenger with the first carrier based on a determination that the first account corresponds to the third account; and
determine preference information of the particular passenger based on the one or more first trip details, the one or more second trip details, and the one or more third trip details.

14. The system of claim 13, wherein the system is caused to determine that the first device identifier corresponds to the second device identifier based on the first device identifier being the same as the second device identifier.

15. The system of claim 13, wherein obtaining the first set of information further comprises obtaining the first set of information from a first branded application indicating a brand association with the first carrier, and wherein obtaining the second set of information further comprises obtaining the second set of information from a second branded application indicating a brand association with the second carrier.

16. The system of claim 13, wherein the system is caused to provide the preference information to the first carrier or the second carrier.

17. The system of claim 13, wherein the one or more first trip details indicate a duration of the first trip, and the one or more second trip details indicate a duration of the second trip, wherein determining the preference information comprises determining first preference information of the particular passenger corresponding to the duration of the first trip and second preference information of the particular passenger corresponding to the duration of the second trip such that different preference information corresponds to different durations of trips.

18. The system of claim 17, wherein the one or more first trip details indicate a type of the first trip, and the one or more second trip details indicate a type of the second trip, wherein determining the preference information comprises determining third preference information of the particular passenger corresponding to the type of the first trip and fourth preference information of the particular passenger corresponding to the type of the second trip such that different preference information corresponds to different types of trips, wherein types of trips include one or more of a domestic trip or an international trip.

19. The system of claim 18, wherein the one or more first trip details indicate one or more in-vehicle service selections requested by the particular passenger during transit of the first trip, and the one or more second trip details indicate one or more in-vehicle service selections requested by the particular passenger during transit of the second trip, and wherein determining the preference information further comprises determining one or more preferences relating to the in-vehicle service selections in association with one or more of the durations of trips or the types of trips traveled by the particular passenger.

20. The system of claim 19, wherein the in-vehicle service selections include one or more selections of content items or accommodations made by the particular passenger during the first or second trips.

21. The system of claim 13, wherein obtaining the first set of information and the second set of information comprises obtaining one or more first selections of in-vehicle services made from a user-provided device of the particular passenger during transit of the first trip and one or more second selections of in-vehicle services made from the user-provided device during transit of the second trip, the user-provided device being provided by the particular passenger during transit of the first and second trips.

22. The system of claim 21, wherein the system is caused to:
facilitate (i) one or more first communication sessions with a first in-vehicle computer system that processes the one or more first selections of in-vehicle services and (ii) one or more second communication sessions with a second in-vehicle computer system that processes the one or more second selections of in-vehicle services,
wherein obtaining the one or more first selections of in-vehicle services and the one or more second selections of in-vehicle services comprises obtaining the one or more first selections of in-vehicle services from the first in-vehicle computer system via the one or more first communication sessions and obtaining the one or more second selections of in-vehicle services from the second in-vehicle computer system via the one or more second communication sessions.

23. The system of claim 13, wherein the first account and the third account are determined to correspond to one another based on a determination that the first account and third account are the same account.

24. The system of claim 13, wherein the first device identifier and the second device identifier are determined to correspond to one another based on a determination that the first device identifier and the second device identifier correspond to the particular passenger.

25. A method for facilitating tracking of passengers based on trip details that indicate whether and which in-vehicle service selections were requested by the passengers during transit on one or more vehicles, the method being implemented on a computer system that includes one or more physical processors executing with one or more computer program instructions which, when executed, perform the method, the method comprising:
obtaining, by the computer system, a first set of information comprising first identification information and one or more first trip details and a second set of information comprising second identification information and one or more second trip details, wherein the first identifying information indicates a first device identifier and a first account that is associated with the particular passenger, and wherein the second identifying information indicates a second device identifier and a second account that is associated with the particular passenger;
determining, by the computer system, that the first set of information relates to a first trip of a particular passenger and the second set of information relates to a second trip of the particular passenger based on a determination that the first device identifier corresponds to the second device identifier;
obtaining, by the computer system, a third set of information comprising third identification information and one or more third trip details, wherein the third identification information indicates a third device identifier different from the first device identifier and a third account that is associated with the particular passenger; and
determining, by the computer system, that the third set of information relates to a third trip of the particular passenger based on a determination that the first account corresponds to the third account; and
determining, by the computer system, preference information of the particular passenger based on the one or more first trip details, the one or more second trip details, and the one or more third trip details.

26. The method of claim 25, wherein the first device identifier is determined to correspond to the second device identifier based on a determination that the first device identifier is the same as the second device identifier.

27. The method of claim 25, wherein obtaining the first set of information and the second set of information comprises obtaining one or more first selections of in-vehicle services made from a user-provided device of the particular passenger during transit of the first trip and one or more second selections of in-vehicle services made from the user-provided device during transit of the second trip, the user-provided device being provided by the particular passenger during transit of the first and second trips.

28. The method of claim 27, the method further comprising:
facilitating, by the computer system, (i) one or more first communication sessions with a first in-vehicle computer system that processes the one or more first selections of in-vehicle services and (ii) one or more second communication sessions with a second in-vehicle computer system that processes the one or more second selections of in-vehicle services,
wherein obtaining the one or more first selections of in-vehicle services and the one or more second selections of in-vehicle services comprises obtaining the one or more first selections of in-vehicle services from the first in-vehicle computer system via the one or more first communication sessions and obtaining the one or more second selections of in-vehicle services from the second in-vehicle computer system via the one or more second communication sessions.

29. A system for facilitating tracking of passengers based on trip details that indicate whether and which in-vehicle service selections were requested by the passengers during transit on one or more vehicles, the system comprising:

one or more physical processors programmed with one or more computer program instructions which, when executed by the one or more physical processors, cause the system to:

obtain a first set of information comprising first identification information and one or more first trip details and a second set of information comprising second identification information and one or more second trip details, wherein the first identifying information indicates a first device identifier and a first account that is associated with the particular passenger, and wherein the second identifying information indicates a second device identifier and a second account that is associated with the particular passenger;

determine that the first set of information relates to a first trip of a particular passenger and the second set of information relates to a second trip of the particular passenger based on a determination that the first device identifier corresponds to the second device identifier;

obtain a third set of information comprising third identification information and one or more third trip details, wherein the third identification information indicates a third device identifier different from the first device identifier and a third account that is associated with the particular passenger; and determine that the third set of information relates to a third trip of the particular passenger based on a determination that the first account corresponds to the third account; and determine preference information of the particular passenger based on the one or more first trip details, the one or more second trip details, and the one or more third trip details.

* * * * *